US012578827B2

(12) United States Patent 
Li et al.

(10) Patent No.: US 12,578,827 B2 
(45) Date of Patent: Mar. 17, 2026

(54) DISPLAY SUBSTRATE AND DISPLAY DEVICE

(71) Applicants: BEIJING BOE DISPLAY TECHNOLOGY CO., LTD., Beijing (CN); BOE TECHNOLOGY GROUP CO., LTD., Beijing (CN)

(72) Inventors: Feng Li, Beijing (CN); Jiabin Zou, Beijing (CN); Na Wen, Beijing (CN); Cuicui Zheng, Beijing (CN); Qi Sang, Beijing (CN); Jing Wang, Beijing (CN); Yan Yan, Beijing (CN); Yu Ma, Beijing (CN); Hui Guo, Beijing (CN); Weitao Chen, Beijing (CN)

(73) Assignees: BEIJING BOE DISPLAY TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/292,311

(22) PCT Filed: Dec. 26, 2022

(86) PCT No.: PCT/CN2022/142060 
§ 371 (c)(1), 
(2) Date: Jan. 25, 2024

(87) PCT Pub. No.: WO2024/138334 
PCT Pub. Date: Jul. 4, 2024

(65) Prior Publication Data 
US 2025/0094005 A1 Mar. 20, 2025

(51) Int. Cl. 
*G06F 3/044* (2006.01) 
*G06F 3/041* (2006.01)

(52) U.S. Cl. 
CPC .......... *G06F 3/0446* (2019.05); *G06F 3/0412* (2013.01); *G06F 3/04164* (2019.05)

(58) Field of Classification Search 
CPC .. G06F 3/0446; G06F 3/04164; G06F 3/0412; G06F 3/0445; G06F 3/041; G06F 3/04182; H10D 86/60; H10K 59/40 
See application file for complete search history.

(56) References Cited

U.S. PATENT DOCUMENTS

2016/0179262 A1* 6/2016 Li .......................... G06F 3/0445 
345/174 
2018/0188584 A1* 7/2018 Yeh ........................ H10D 86/60 
(Continued)

FOREIGN PATENT DOCUMENTS

CN 101893962 A 11/2010 
CN 104597646 A 5/2015 
(Continued)

OTHER PUBLICATIONS

State Intellectual Property Office of the People's Republic of China, Office Action and Search Report Issued in Application No. 202280005271.9, Jul. 23, 2025, 11 pages. (Submitted with Partial Translation).

*Primary Examiner* — Richard J Hong 
(74) *Attorney, Agent, or Firm* — McCoy Russell LLP

(57) ABSTRACT

The present disclosure provides a display substrate and a display device. The display substrate includes a base substrate, the base substrate includes an IC region, and the IC region includes a first electrode arrangement region and a first transistor arrangement region. The display substrate includes a plurality of first touch electrodes arranged in rows and columns in the first electrode arrangement region, and a plurality of first switching transistors arranged in the first transistor arrangement region. Each first touch electrode is electrically coupled to a corresponding first switching tran- (Continued)

sistor, and an orthogonal projection of a display data receiving electrode onto the base substrate does not overlap with an orthogonal projection of the first touch electrode onto the base substrate.

19 Claims, 17 Drawing Sheets

(56)                References Cited

U.S. PATENT DOCUMENTS

| | | | | |
|---|---|---|---|---|
| 2022/0187972 | A1* | 6/2022 | Sung | G06F 3/04182 |
| 2022/0269363 | A1 | 8/2022 | Li et al. | |
| 2022/0350458 | A1 | 11/2022 | Zhu et al. | |
| 2023/0359300 | A1* | 11/2023 | Liu | G06F 3/0412 |
| 2024/0196721 | A1* | 6/2024 | He | H10K 59/40 |
| 2024/0395829 | A1* | 11/2024 | Ma | H10D 86/60 |

FOREIGN PATENT DOCUMENTS

| | | | | | |
|---|---|---|---|---|---|
| CN | 105652498 | A | | 6/2016 | |
| CN | 109917962 | A | | 6/2019 | |
| CN | 110399960 | A | | 11/2019 | |
| CN | 110989855 | A | * | 4/2020 | G06F 3/041 |
| CN | 112083836 | A | | 12/2020 | |
| CN | 112436047 | A | | 3/2021 | |
| CN | 112835474 | A | | 5/2021 | |
| CN | 113010042 | A | | 6/2021 | |
| CN | 113053990 | A | | 6/2021 | |
| CN | 114967986 | A | | 8/2022 | |
| CN | 115047986 | A | | 9/2022 | |
| EP | 2565758 | A2 | | 3/2013 | |
| KR | 20140081094 | A | | 7/2014 | |
| TW | 202034138 | A | | 9/2020 | |
| WO | 2019052531 | A1 | | 3/2019 | |
| WO | 2021180126 | A1 | | 9/2021 | |

* cited by examiner

81

A2

S2

W2

MZ2

B0

Tw1

T0

Tw2

Z6

DISPLAY SUBSTRATE AND DISPLAY DEVICE

CROSS REFERENCE TO RELATED APPLICATION

This application is the U.S. national phase of PCT Application No. PCT/CN2022/142060 filed on Dec. 26, 2022, the entire contents of which are hereby incorporated by reference.

TECHNICAL FIELD

The present disclosure relates to the field of display technology, in particular to a display substrate and a display device.

BACKGROUND

In the related art, touch and display driver integration (TDDI) circuits have been widely used in such display products as mobile phones, tablet computers and desktop displays, and the improvement in the performance of the display products is mainly focused on resolution and touch performance. A most direct way to improve the touch performance of an integrated circuit (IC) is to increase the quantity of touch channels inside a single IC, i.e., to increase the quantity of touch electrode lines. However, this leads to a too large space occupied by the touch electrode lines, so it is adverse to an appropriate layout.

SUMMARY

In one aspect, the present disclosure provides in some embodiments a display substrate, including a base substrate. The base substrate includes an integrated circuit (IC) region, and the IC region includes a first electrode arrangement region and a first transistor arrangement region. The display substrate includes a plurality of first touch electrodes arranged in rows and columns in the first electrode arrangement region, and a plurality of first switching transistors arranged in the first transistor arrangement region. The first touch electrode is electrically coupled to a corresponding first switching transistor, and an orthogonal projection of a display data receiving electrode onto the base substrate does not overlap with an orthogonal projection of the first touch electrode onto the base substrate.

In a possible embodiment of the present disclosure, the IC region further includes a fan-out region, the first touch electrode is electrically coupled to a first electrode of the first switching transistor through a connection line arranged in the fan-out region, and a second electrode of the first switching transistor is electrically coupled to a first voltage line for providing a common electrode voltage.

In a possible embodiment of the present disclosure, the plurality of first switching transistors is arranged in the first transistor arrangement region in an array form.

In a possible embodiment of the present disclosure, the display substrate includes a gate metal layer, a semiconductor layer and a source/drain metal layer laminated one on another in a direction away from the base substrate, the first touch electrode is formed in the source/drain metal layer, a gate electrode of the first switching transistor is formed in the gate metal layer, the first electrode of the first switching transistor and the second electrode of the first switching transistor are formed in the source/drain metal layer, and an active layer pattern of the first switching transistor is formed in the semiconductor layer.

In a possible embodiment of the present disclosure, the display substrate further includes a conductive layer arranged at a side of the source/drain metal layer away from the base substrate, and a touch display IC arranged at a side of the conductive layer away from the base substrate, the first touch electrode is electrically coupled to a first electrode pin of the touch display IC through a first adapter member formed in the conductive layer, and the touch display IC is configured to provide a touch signal through the first electrode pin.

In a possible embodiment of the present disclosure, the first voltage line is formed in the gate metal layer, and the second electrode of the first switching transistor is electrically coupled to the first voltage line through a second adapter member formed in the conductive layer.

In a possible embodiment of the present disclosure, the IC region further includes a second electrode arrangement region, the display substrate further includes a plurality of electrode groups arranged in rows in the second electrode arrangement region, the electrode group in each row includes a plurality of second touch electrodes and a plurality of display data receiving electrodes, and the second touch electrodes and the display data receiving electrodes are arranged alternately in the electrode group in each row.

In a possible embodiment of the present disclosure, in the electrode group in each row, one second touch electrode and at least two display data receiving electrodes are arranged alternately.

In a possible embodiment of the present disclosure, in the electrode groups in adjacent rows, the second touch electrodes are located in different columns.

In a possible embodiment of the present disclosure, the IC region further includes a second transistor arrangement region, the display substrate includes a plurality of second switching transistors arranged in the second transistor arrangement region, the second touch electrode is electrically coupled to a first electrode of a corresponding second switching transistor, and a second electrode of the second switching transistor is electrically coupled to the first voltage line for providing the common electrode voltage.

In a possible embodiment of the present disclosure, the plurality of second switching transistors is arranged in a same row.

In a possible embodiment of the present disclosure, the display substrate includes a gate metal layer, a semiconductor layer and a source/drain metal layer laminated one on another in a direction away from the base substrate, the second touch electrode is formed in the source/drain metal layer, a gate electrode of the second switching transistor is formed in the gate metal layer, the first electrode of the second switching transistor and the second electrode of the second switching transistor are formed in the source/drain metal layer, an active layer pattern of the second switching transistor is formed in the semiconductor layer, and the display data receiving electrodes are formed in the gate metal layer or the source/drain metal layer.

In a possible embodiment of the present disclosure, the display substrate further includes a conductive layer arranged at a side of the source/drain metal layer away from the base substrate, and a touch display IC arranged at a side of the conductive layer away from the base substrate, the second touch electrode is electrically coupled to a first electrode pin of the touch display IC through a third adapter member formed in the conductive layer, and the touch display IC is configured to provide a touch signal through the first electrode pin.

In a possible embodiment of the present disclosure, the display data receiving electrode is electrically coupled to a second electrode pin of the touch display IC through a fourth adapter member formed in the conductive layer, and the touch display IC is configured to provide a corresponding data voltage through the second electrode pin.

In a possible embodiment of the present disclosure, the second electrode of the second switching transistor is electrically coupled to the first voltage line for providing the common electrode voltage through a fifth adapter member formed in the conductive layer.

In a possible embodiment of the present disclosure, gate electrodes of the plurality of first switching transistors and gate electrodes of the plurality of second switching transistors are of a one-piece structure.

In a possible embodiment of the present disclosure, the IC region further includes a dummy electrode arrangement region arranged at a side of the first electrode arrangement region away from the second electrode arrangement region, the display substrate further includes a plurality of dummy electrodes arranged in the dummy electrode arrangement region, and the dummy electrodes do not receive signals.

In a possible embodiment of the present disclosure, the display substrate includes a gate metal layer, a semiconductor layer, a source/drain metal layer and a conductive layer laminated one on another in a direction away from the base substrate, the dummy electrodes are formed in the source/drain metal layer or the gate metal layer, the dummy electrode is electrically coupled to a sixth adapter member formed in the conductive layer, and the sixth adapter member does not receive any signal.

In another aspect, the present disclosure provides in some embodiments a display device, including the above-mentioned display substrate.

DETAILED DESCRIPTION

Figure 1:
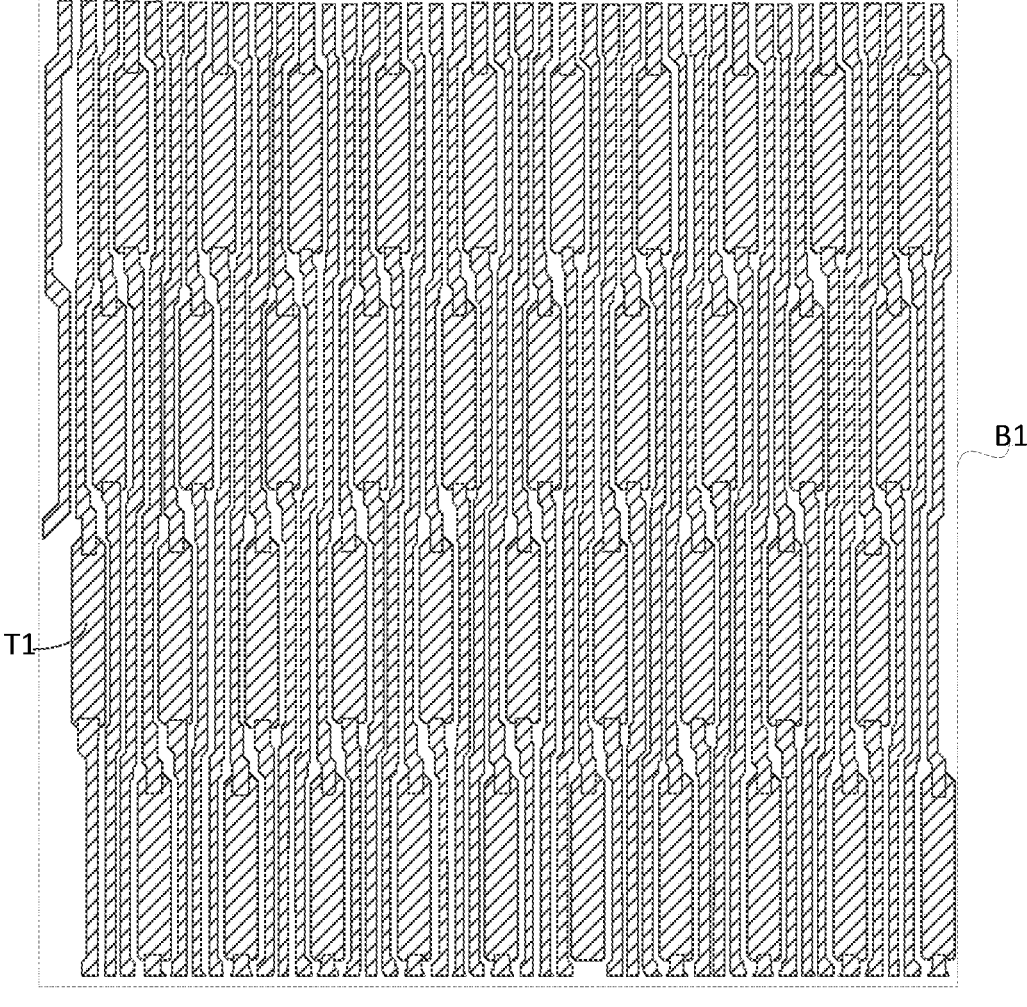
FIG. 1 is a schematic view showing the arrangement of a source/drain metal layer in a first electrode arrangement region B1 according to one embodiment of the present disclosure.

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

All transistors adopted in the embodiments of the present disclosure may be thin film transistors (TFT), field effect transistors (FETs) or any other elements having an identical characteristic. In order to differentiate two electrodes other than a control electrode from each other, one of the two electrodes is called as first electrode and the other is called as second electrode.

In actual use, when the transistor is a TFT or FET, the first electrode may be a drain electrode and the second electrode may be a source electrode, or the first electrode may be a source electrode and the second electrode may be a drain electrode.

The present disclosure provides in some embodiments a display substrate, which includes a base substrate. The base substrate includes an IC region, and the IC region includes a first electrode arrangement region and a first transistor arrangement region. The display substrate includes a plurality of first touch electrodes arranged in rows and columns in the first electrode arrangement region, and a plurality of first switching transistors arranged in the first transistor arrangement region. Each first touch electrode is electrically coupled to a corresponding first switching transistor, and an orthogonal projection of a display data receiving electrode onto the base substrate does not overlap with an orthogonal projection of the first touch electrode onto the base substrate.

Due to an increase in the quantity of touch electrodes, in the display substrate according to the embodiments of the present disclosure, a part of the touch electrodes are arranged in the first electrode arrangement region, each first switching transistor electrically coupled to the corresponding touch electrode arranged in the first electrode arrangement region is arranged in the first transistor arrangement region, and the orthogonal projection of the display data receiving electrode onto the base substrate does not overlap with the orthogonal projection of the first touch electrode onto the base substrate, i.e., there is no display data receiving electrode in the first electrode arrangement region. According to the embodiments of the present disclosure, it is able to reduce the difficulty in wiring when the quantity of the touch electrodes increases, thereby to achieve the appropriate layout of the touch electrodes.

In a possible embodiment of the present disclosure, the IC region is a region for bonding touch display ICs.

During the implementation, each of the plurality of first switching transistors arranged in the first transistor arrangement region corresponds to a respective one of the plurality of first touch electrodes arranged in rows and columns in the first electrode arrangement region, and each first touch electrode is electrically coupled to a corresponding first switching transistor.

In a possible embodiment of the present disclosure, the IC region further includes a fan-out region. The first touch electrode is electrically coupled to a first electrode of the first switching transistor through a connection line arranged in the fan-out region, and a second electrode of the first switching transistor is electrically coupled to a first voltage line for providing a common electrode voltage.

During the implementation, in an array test (AT) and a cell test (CT), a common electrode voltage signal needs to be provided to a display panel through the touch electrode, so the switching transistor needs to be electrically coupled to the touch electrode and the first voltage line for providing the common electrode voltage at the same time.

During the implementation, the IC region further includes the fan-out region, the first touch electrode is electrically coupled to the first electrode of a corresponding first switching transistor through the connection line in the fan-out region, and the second electrode of the first switching transistor is electrically coupled to the first voltage line for providing the common electrode voltage. The first switching transistor controls the common electrode voltage to be written into a corresponding first touch electrode through the first switching transistor under the control of a potential at the gate electrode thereof.

In a possible embodiment of the present disclosure, the plurality of first switching transistors is arranged in the first transistor arrangement region in an array form.

During the implementation, the plurality of first switching transistors is arranged in rows and columns in the first electrode arrangement region.

In a possible embodiment of the present disclosure, the display substrate includes a gate metal layer, a semiconductor layer and a source/drain metal layer laminated one on another in a direction away from the base substrate. The first touch electrode is formed in the source/drain metal layer, a gate electrode of the first switching transistor is formed in the gate metal layer, the first electrode of the first switching transistor and the second electrode of the first switching transistor are formed in the source/drain metal layer, and an active layer pattern of the first switching transistor is formed in the semiconductor layer.

In a possible embodiment of the present disclosure, the display substrate further includes a conductive layer arranged at a side of the source/drain metal layer away from the base substrate, and a touch display IC arranged at a side of the conductive layer away from the base substrate. The first touch electrode is electrically coupled to a first electrode pin of the touch display IC through a first adapter member formed in the conductive layer, and the touch display IC is configured to provide a touch signal through the first electrode pin.

In a possible embodiment of the present disclosure, the conductive layer is, but not limited to, made of indium tin oxide (ITO).

In a possible embodiment of the present disclosure, the first voltage line is formed in the gate metal layer, and the second electrode of the first switching transistor is electrically coupled to the first voltage line through a second adapter member formed in the conductive layer.

As shown in FIG. 1, a plurality of first touch electrodes T1 arranged in rows and columns is formed in the source/drain metal layer in the first electrode arrangement region B1.

Figure 2:
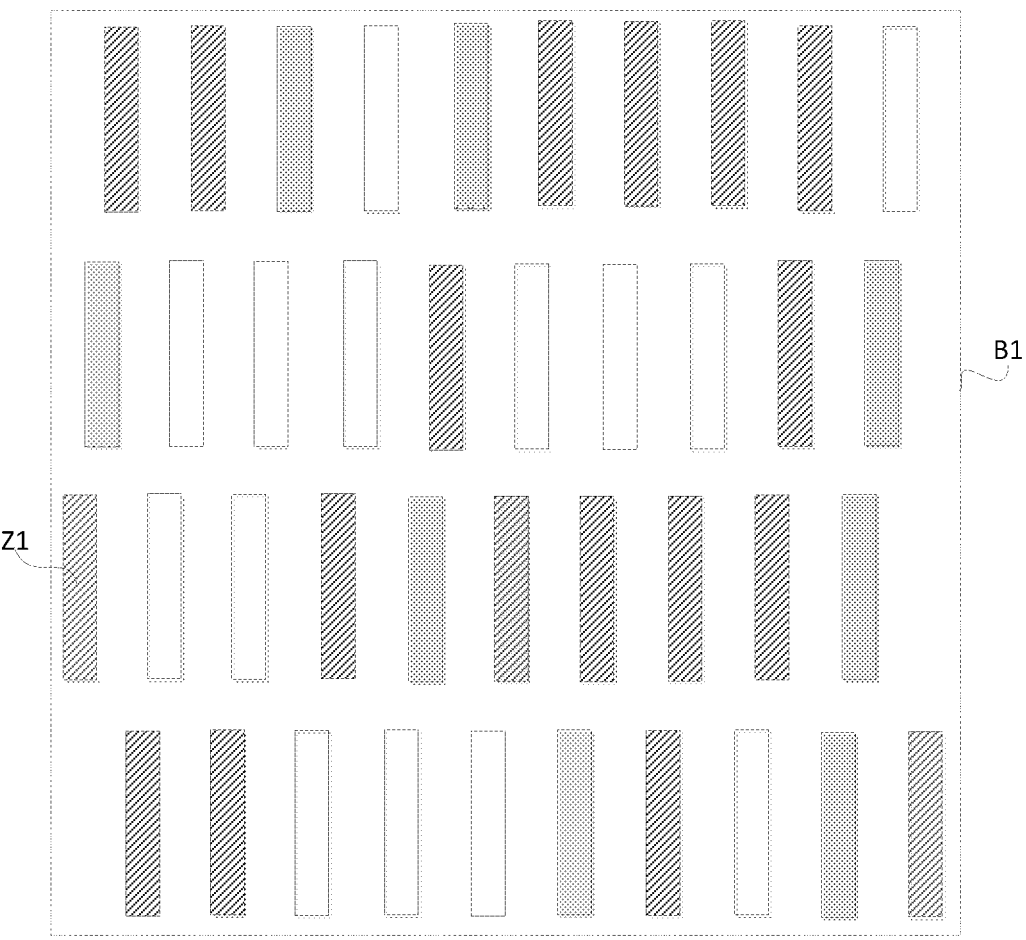
FIG. 2 is a schematic view showing the arrangement of a conductive layer in the first electrode arrangement region B1 according to one embodiment of the present disclosure.

As shown in FIG. 2, a plurality of first adapter members Z1 arranged in rows and columns is arranged in the first electrode arrangement region B1.

Figure 3:
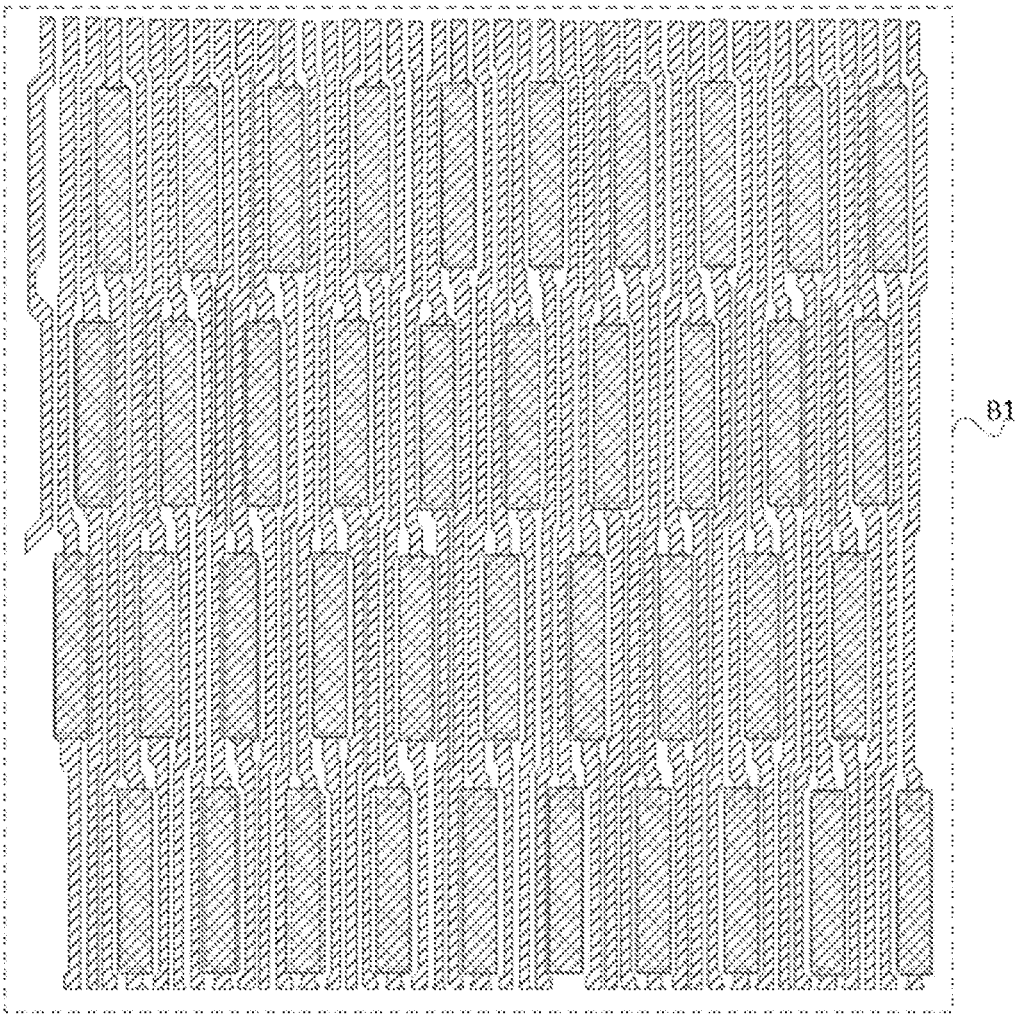
FIG. 3 is a schematic view showing a situation where the conductive layer in FIG. 2 is superimposed onto the source/drain metal layer in FIG. 1.

As shown in FIG. 3, the first touch electrode T1 is electrically coupled to the first electrode pin of the touch display IC through the first adapter member Z1 formed in the conductive layer, and the touch display IC is configured to provide a touch signal to the first touch electrode through the first electrode pin and the first adapter member Z1. The conductive layer is arranged at a side of the source/drain metal layer away from the base substrate, and the touch display IC is arranged at a side of the conductive layer away from the base substrate.

Figures 4, 5:
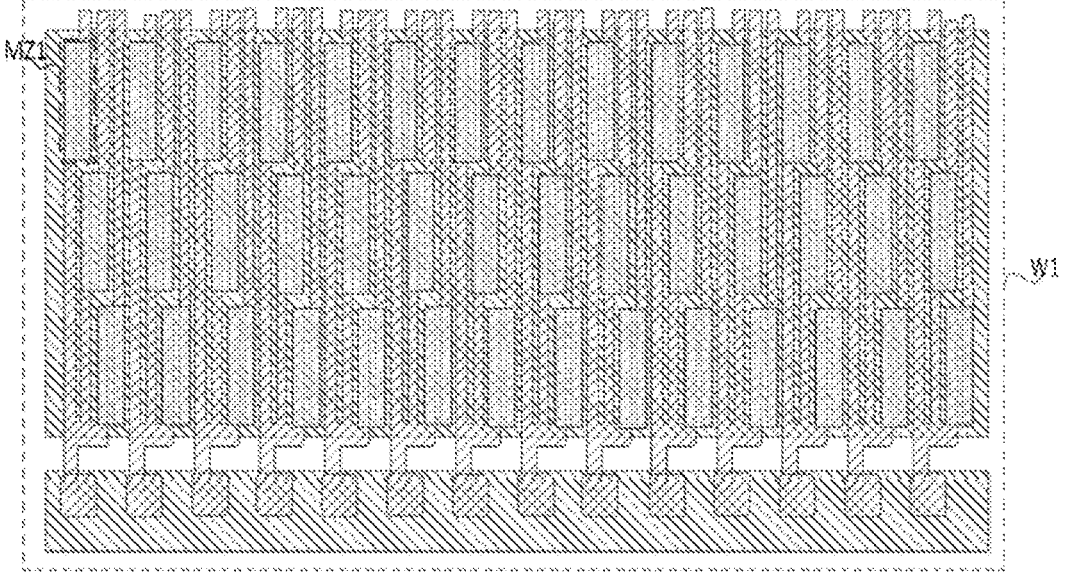
FIG. 4 is a schematic view showing first switching transistors and a first voltage line arranged in a first transistor arrangement region W1 according to one embodiment of the present disclosure.
FIG. 5 is a schematic view showing the arrangement of a gate metal layer in FIG. 4.

As shown in FIG. 4, first switching transistors MZ1 are arranged in three rows in the first transistor arrangement region W1.

FIG. 5 shows the arrangement of the gate metal layer in FIG. 4.

In FIG. 5, G1 represents a first gate metal layer pattern, Lb1 represents a first voltage line portion in the first voltage line for providing the common electrode voltage, and the first gate metal layer pattern G1 serves as gate electrodes of all the first switching transistors MZ1 in the first transistor arrangement region W1.

Figure 6:
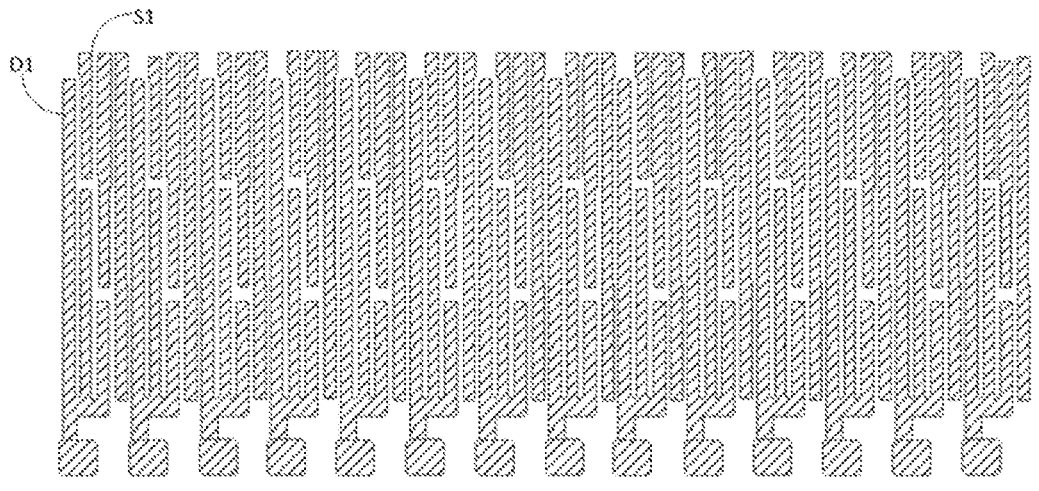
FIG. 6 is a schematic view showing the arrangement of the source/drain metal layer in FIG. 4.
Figure 7:
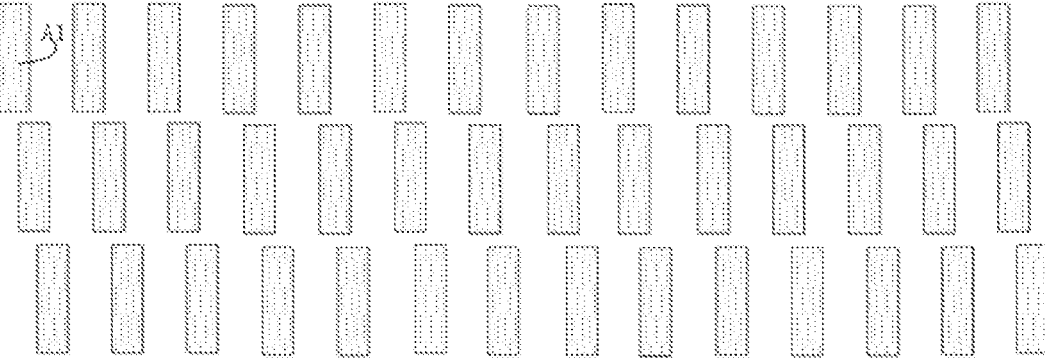
FIG. 7 is a schematic view showing the arrangement of a semiconductor layer in FIG. 4.

FIG. 6 shows the arrangement of the source/drain metal layer in FIG. 4, and FIG. 7 shows the arrangement of the semiconductor layer in FIG. 4.

In FIG. 6, S1 represents the first electrode of the first switching transistor MZ1, and D1 represents the second electrode of the first switching transistor MZ1.

In FIG. 7, A1 represents the active layer pattern of MZ1.

Figure 8:
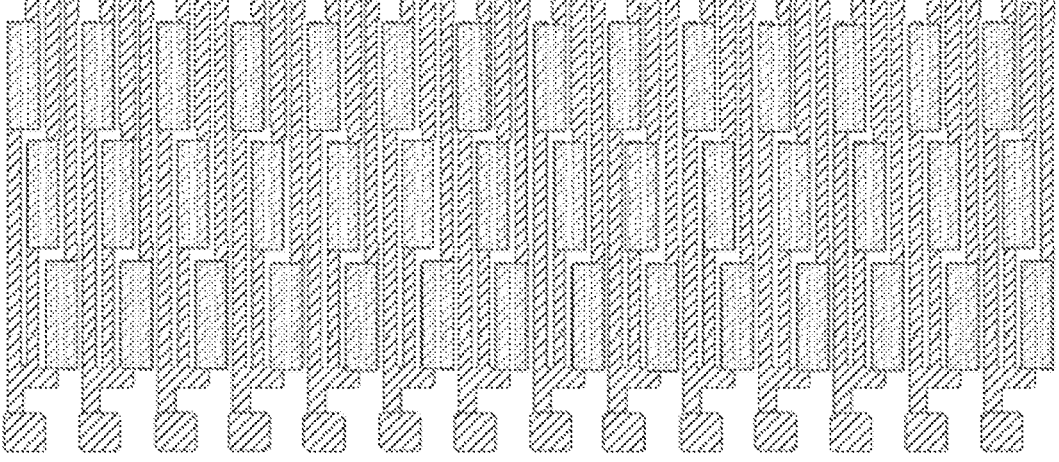
FIG. 8 is a schematic view showing a situation where the source/drain metal layer is superimposed onto the semiconductor layer in FIG. 4.

FIG. 8 shows a situation where the source/drain metal layer in FIG. 6 is superimposed onto the semiconductor layer in FIG. 7.

Figure 9:
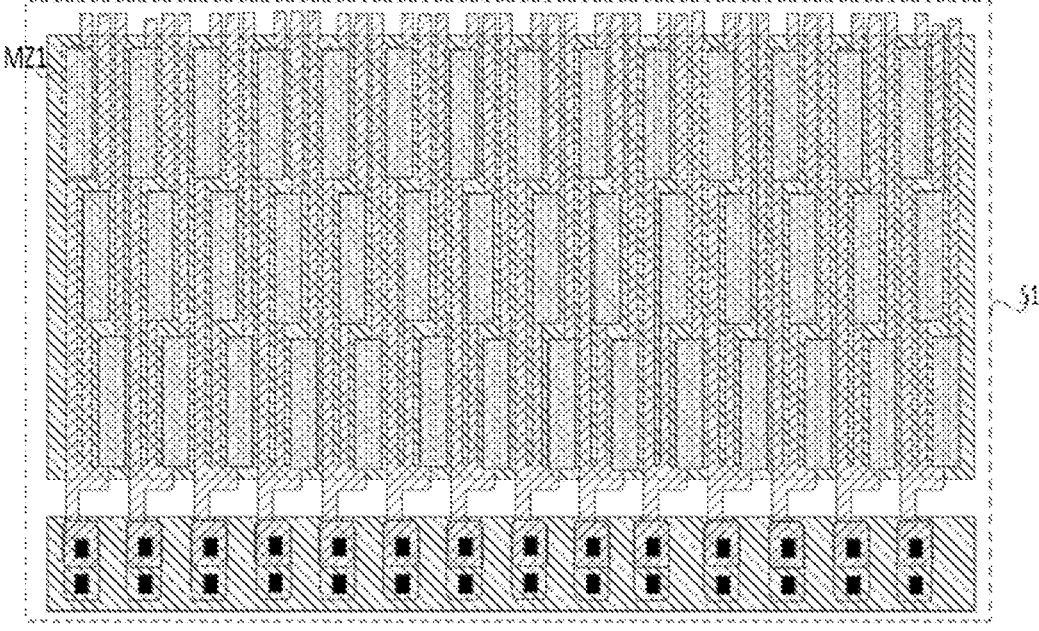
FIG. 9 is a schematic view showing a situation where the conductive layer is added on the basis of FIG. 4.

As shown in FIG. 9, on the basis of FIG. 4, the conductive layer is arranged at a side of the source/drain metal layer away from the base substrate, and the second adapter member is formed in the conductive layer. As shown in FIG. 4 to FIG. 10, the second electrode of the first switching transistor is electrically coupled to the first voltage line portion Lb1 through the second adapter member Z2.

Figure 10:
FIG. 10 is a schematic view showing the arrangement of the conductive layer in FIG. 9.

FIG. 10 shows the arrangement of the conductive layer in FIG. 9. In FIG. 10, Z2 represents the second adapter member.

Figure 11:
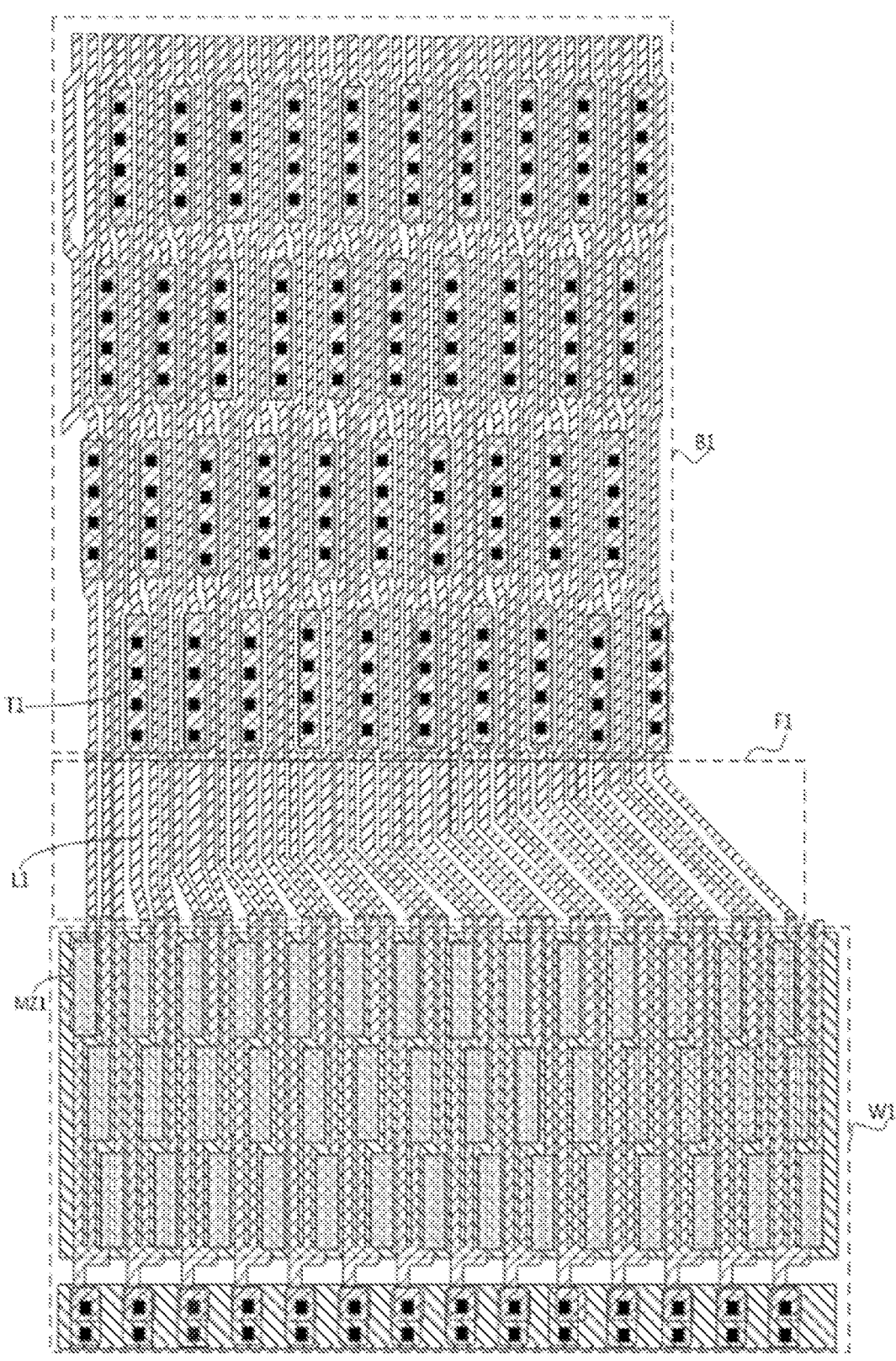
FIG. 11 is a schematic view showing a connection relationship between a first touch electrode T1 in the first electrode arrangement region B1 and a corresponding first switching transistor MZ1 in the first transistor arrangement region W1 according to one embodiment of the present disclosure.

As shown in FIG. 11, B1 represents the first electrode arrangement region, W1 represents the first transistor arrangement region, and F1 represents the fan-out region. The first touch electrode T1 arranged in the first electrode arrangement region B1 is electrically coupled to the corresponding first switching transistor MZ1 arranged in the first transistor arrangement region W1 through a first connection line L1 arranged in the fan-out region F1.

In FIG. 11, in the first transistor arrangement region W1, a pitch between adjacent first switching units is, but not limited to, 8.5 μm. The first switching unit includes the first switching transistor.

In a possible embodiment of the present disclosure, the IC region further includes a second electrode arrangement region. The display substrate further includes a plurality of electrode groups arranged in rows in the second electrode arrangement region, the electrode group arranged in each row includes a plurality of second touch electrodes and a plurality of display data receiving electrodes, and the second touch electrodes and the display data receiving electrodes are arranged alternately in the electrode group arranged in the row.

During the implementation, in the second electrode arrangement region, the second touch electrodes and the display data receiving electrodes in the electrode group arranged in one row are arranged alternately, so as to reduce the difficulty in wiring when the quantity of the touch electrodes increases.

In a possible embodiment of the present disclosure, in the second electrode arrangement region, the second touch electrode is, but not limited to, included in the electrode group in each row.

In a possible embodiment of the present disclosure, in the electrode group in the row, one second touch electrode and at least two display data receiving electrodes are arranged alternately.

During the implementation, in the second electrode arrangement region, the second touch electrodes and the display data receiving electrodes in the electrode group in one row are regularly distributed.

In a possible embodiment of the present disclosure, in the electrode groups in adjacent rows, the second touch electrodes are located in different columns for easy wiring.

In a possible embodiment of the present disclosure, the IC region further includes a second transistor arrangement region, the display substrate includes a plurality of second switching transistors arranged in the second transistor arrangement region, the second touch electrode is electrically coupled to a first electrode of a corresponding second switching transistor, and a second electrode of the second switching transistor is electrically coupled to the first voltage line for providing the common electrode voltage.

In a possible embodiment of the present disclosure, the plurality of second switching transistors is arranged in a same row for easy wiring.

In a possible embodiment of the present disclosure, the display substrate includes a gate metal layer, a semiconductor layer and a source/drain metal layer laminated one on another in a direction away from the base substrate. The second touch electrode is formed in the source/drain metal layer, a gate electrode of the second switching transistor is formed in the gate metal layer, the first electrode of the second switching transistor and the second electrode of the second switching transistor are formed in the source/drain metal layer, an active layer pattern of the second switching transistor is formed in the semiconductor layer, and the display data receiving electrodes are formed in the gate metal layer or the source/drain metal layer.

In a possible embodiment of the present disclosure, the display substrate further includes a conductive layer arranged at a side of the source/drain metal layer away from the base substrate, and a touch display IC arranged at a side of the conductive layer away from the base substrate. The second touch electrode is electrically coupled to a first electrode pin of the touch display IC through a third adapter member formed in the conductive layer, and the touch display IC is configured to provide a touch signal through the first electrode pin.

In a possible embodiment of the present disclosure, each display data receiving electrode is electrically coupled to a second electrode pin of the touch display IC through a fourth adapter member formed in the conductive layer, and the touch display IC is configured to provide a corresponding data voltage through the second electrode pin.

During the implementation, the display data receiving electrode is electrically coupled to the second electrode pin of the touch display IC through the fourth adapter member, and the touch display IC provides the data voltage to the display data receiving electrode through the second electrode pin.

In a possible embodiment of the present disclosure, the second electrode of the second switching transistor is electrically coupled to the first voltage line for providing the common electrode voltage through a fifth adapter member formed in the conductive layer, so as to receive the common electrode voltage.

In a possible embodiment of the present disclosure, gate electrodes of the plurality of first switching transistors and gate electrodes of the plurality of second switching transistors are formed integrally.

Figure 12:
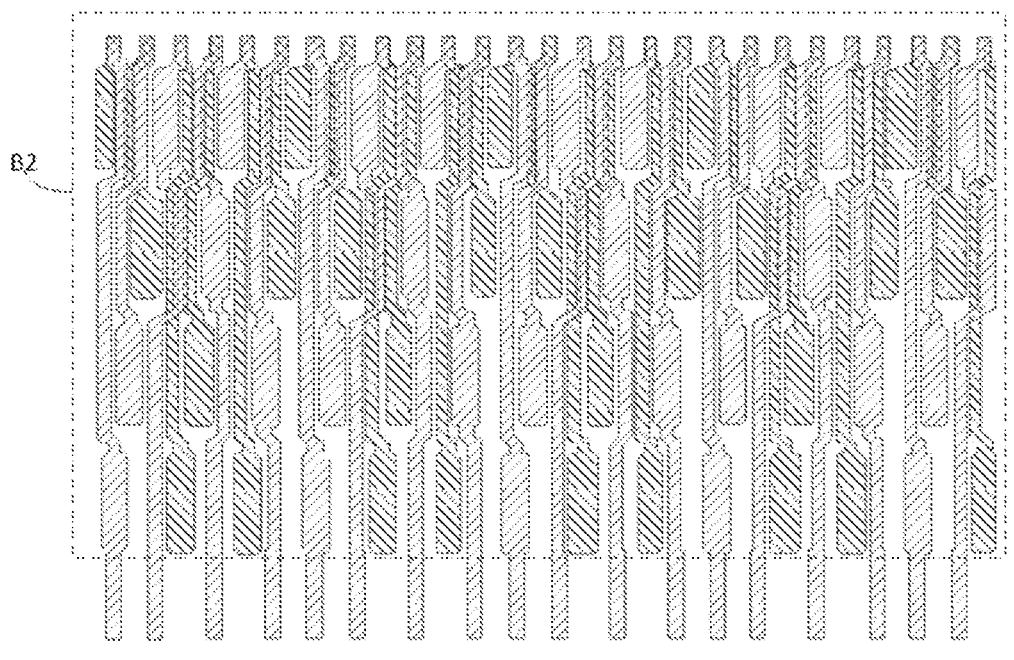
FIG. 12 is a schematic view showing a second touch electrode arranged in a second electrode arrangement region B2 according to one embodiment of the present disclosure.
Figure 13:
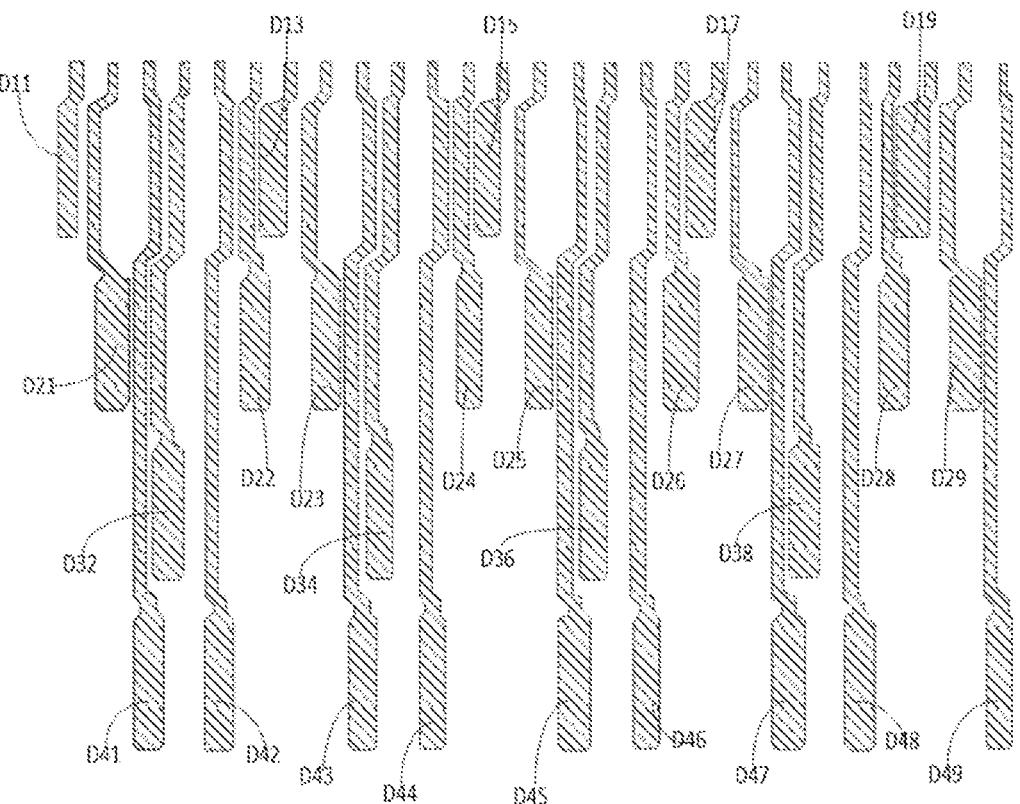
FIG. 13 is a schematic view showing the arrangement of the gate metal layer in FIG. 12.
Figure 14:
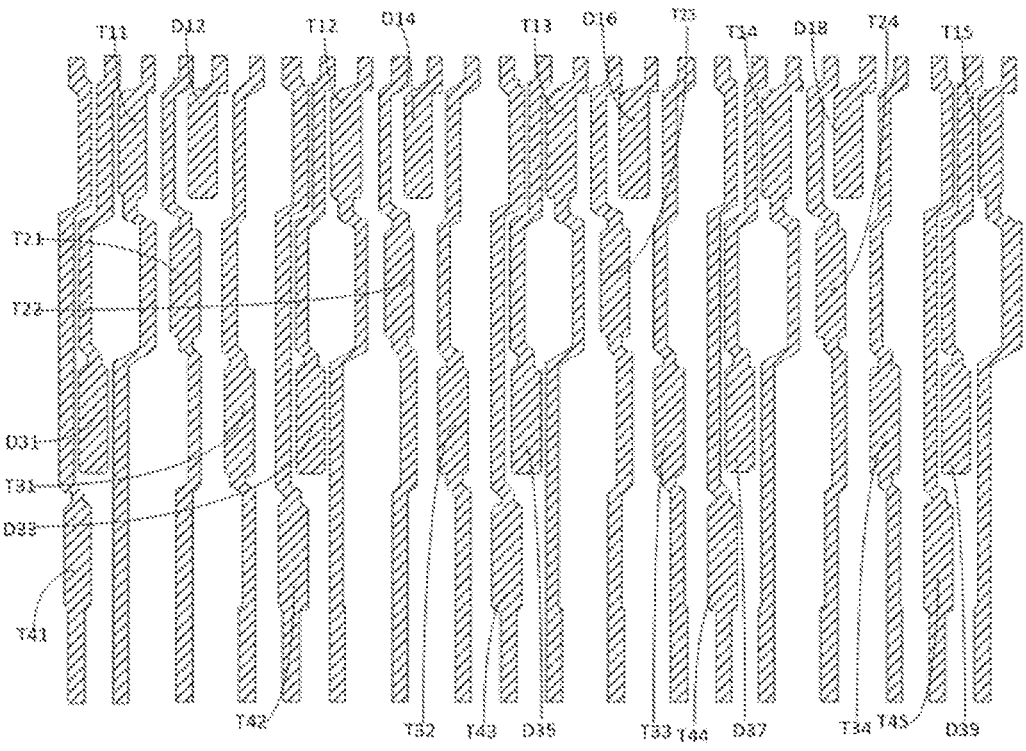
FIG. 14 is a schematic view showing the arrangement of the source/drain metal layer in FIG. 12.

As shown in FIG. 12 to FIG. 14, the second touch electrodes and the display data receiving electrodes are arranged alternately in the second electrode arrangement region B2 of the IC region, and two display data receiving electrodes are arranged between two adjacent second touch electrodes in the electrode group in one row.

FIG. 13 shows the arrangement of the gate metal layer in FIG. 12, and FIG. 14 shows the arrangement of the source/drain metal layer in FIG. 12.

In FIG. 13 and FIG. 14, D11 represents the display data receiving electrode in a first row and a first column, D12 represents the display data receiving electrode in the first row and a second column, D13 represents the display data receiving electrode in the first row and a third column, D14 represents the display data receiving electrode in the first row and a fourth column, D15 represents the display data receiving electrode in the first row and a fifth column, D16 represents the display data receiving electrode in the first row and a sixth column, D17 represents the display data receiving electrode in the first row and a seventh column, D18 represents the display data receiving electrode in the first row and an eighth column, and D19 represents the display data receiving electrode in the first row and a ninth column.

D21 represents the display data receiving electrode in a second row and the first column, D22 represents the display data receiving electrode in the second row and the second column, D23 represents the display data receiving electrode in the second row and the third column, D24 represents the display data receiving electrode in the second row and the fourth column, D25 represents the display data receiving electrode in the second row and the fifth column, D26 represents the display data receiving electrode in the second row and the sixth column, D27 represents the display data receiving electrode in the second row and the seventh column, D28 represents the display data receiving electrode in the second row and the eighth column, and D29 represents the display data receiving electrode in the second row and the ninth column.

D31 represents the display data receiving electrode in a third row and the first column, D32 represents the display data receiving electrode in the third row and the second column, D33 represents the display data receiving electrode in the third row and the third column, D34 represents the display data receiving electrode in the third row and the fourth column, D35 represents the display data receiving electrode in the third row and the fifth column, D36 represents the display data receiving electrode in the third row and the sixth column, D37 represents the display data receiving electrode in the third row and the seventh column, D38 represents the display data receiving electrode in the third row and the eighth column, and D39 represents the display data receiving electrode in the third row and the ninth column.

D41 represents the display data receiving electrode in a fourth row and the first column, D42 represents the display data receiving electrode in the fourth row and the second column, D43 represents the display data receiving electrode in the fourth row and the third column, D44 represents the display data receiving electrode in the fourth row and the fourth column, D45 represents the display data receiving electrode in the fourth row and the fifth column, D46 represents the display data receiving electrode in the fourth row and the sixth column, D47 represents the display data receiving electrode in the fourth row and the seventh column, D48 represents the display data receiving electrode in the fourth row and the eighth column, and D49 represents the display data receiving electrode in the fourth row and the ninth column.

T11 represents the second touch electrode in the first row and the first column, T12 represents the second touch electrode in the first row and the second column, T13 represents the second touch electrode in the first row and the third column, T14 represents the second touch electrode in the first row and the fourth column, and T15 represents the second touch electrode in the first row and the fifth column.

T21 represents the second touch electrode in the second row and the first column, T22 represents the second touch electrode in the second row and the second column, T23 represents the second touch electrode in the second row and the third column, and T24 represents the second touch electrode in the second row and the fourth column.

T31 represents the second touch electrode in the third row and the first column, T32 represents the second touch electrode in the third row and the second column, T33 represents the second touch electrode in the third row and the third column, and T34 represents the second touch electrode in the third row and the fourth column.

T41 represents the second touch electrode in the fourth row and the first column, T42 represents the second touch electrode in the fourth row and the second column, T43 represents the second touch electrode in the fourth row and the third column, T44 represents the second touch electrode in the fourth row and the fourth column, and T45 represents the second touch electrode in the fourth row and the fifth column.

D12 and D13 are arranged between T11 and T12, D14 and D15 are arranged between T12 and T13, D16 and D17 are arranged between T13 and T14, and D18 and D19 are arranged between T14 and T15.

D22 and D23 are arranged between T21 and T22, D24 and D25 are arranged between T22 and T23, D26 and D27 are arranged between T23 and T24, and D28 and D29 are arranged between T24 and T25.

D31 and D32 are arranged at the left side of T31, D33 and D34 are arranged between T31 and T32, D35 and D36 are arranged between T32 and T33, D37 and D38 are arranged between T33 and T34, and D39 is arranged at the right side of T34.

D41 and D42 are arranged between T41 and T42, D43 and D44 are arranged between T42 and T43, D45 and D46 are arranged between T43 and T44, D47 and D48 are arranged between T44 and T45, and D49 is arranged at the right side of T45.

As shown in FIG. 12 to FIG. 14, the second touch electrodes are, but not limited to, included in each row of the electrode groups. During the implementation, the second touch electrodes are arranged in any row of the electrode groups.

Figure 15:
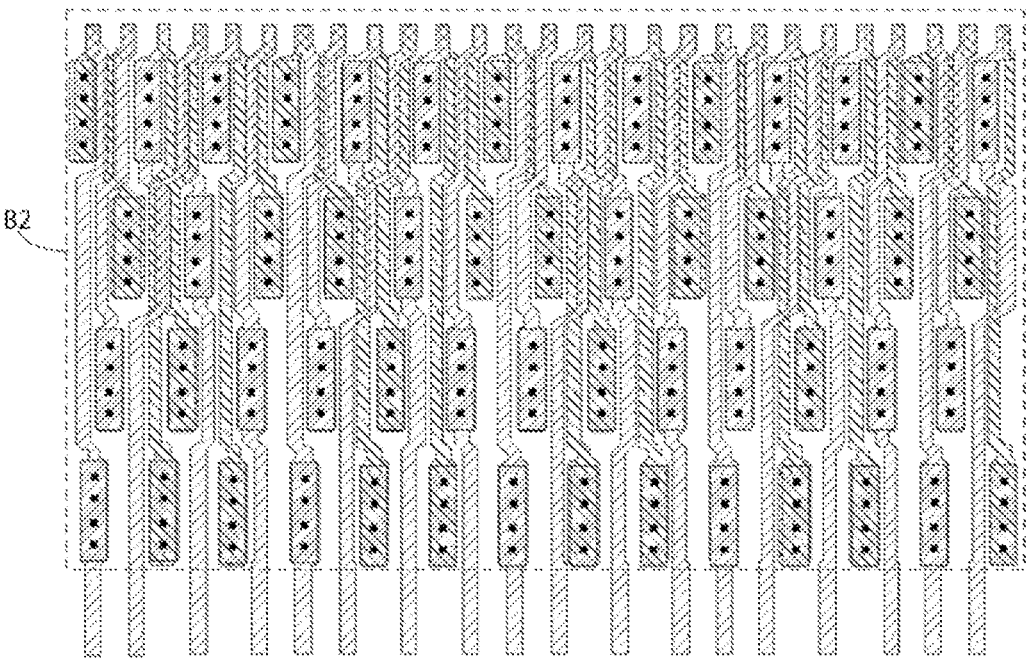
FIG. 15 is a schematic view showing a situation where the conductive layer and via holes are added on the basis of FIG. 12.

FIG. 15 shows a situation where the conductive layer is added on the basis of FIG. 12. The conductive layer is arranged at a side of the source/drain metal layer away from the gate metal layer, and the gate metal layer, the source/drain metal layer and the conductive layer are arranged in a direction away from the base substrate.

Figure 16:
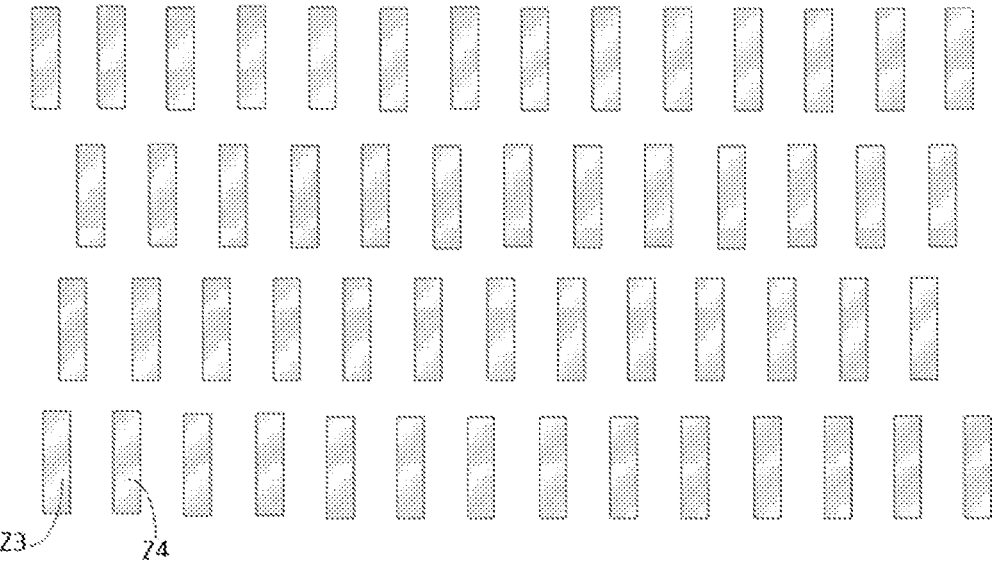
FIG. 16 is a schematic view showing the arrangement of the conductive layer in FIG. 15.

FIG. 16 shows the arrangement of the conductive layer in FIG. 15.

In a possible embodiment of the present disclosure, the display substrate further includes the touch display IC arranged at a side of the conductive layer away from the base substrate, the second touch electrode is electrically coupled to the first electrode pin of the touch display IC through the third adapter member Z3 formed in the conductive layer, and the touch display IC is configured to provide the touch signal through the first electrode pin.

Each display data receiving electrode is electrically coupled to the second electrode pin of the touch display IC through the fourth adapter member Z4 formed in the conductive layer, and the touch display IC is used to provide the data voltage to the display data receiving electrode through the second electrode pin.

Figure 17:
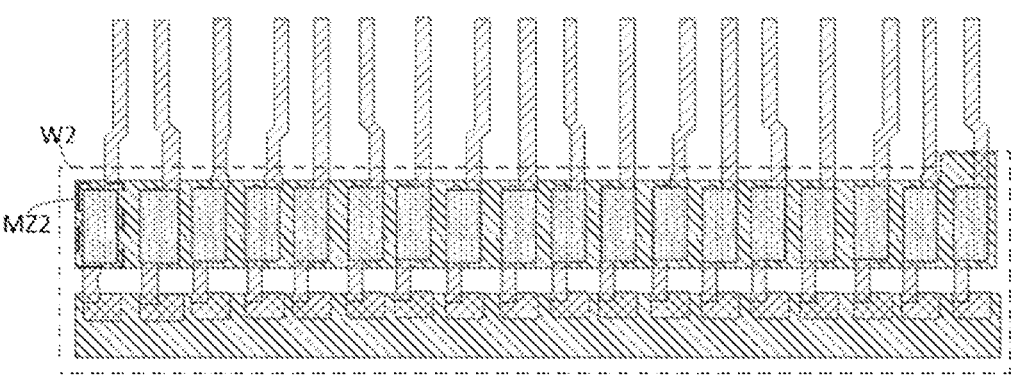
FIG. 17 is a schematic view showing a second switching transistor arranged in a second transistor arrangement region W2 according to one embodiment of the present disclosure.

As shown in FIG. 17, the IC region further includes a second transistor arrangement region W2, the display substrate includes a plurality of second switching transistors MZ2 arranged in the second transistor arrangement region W2, and the plurality of second switching transistors is arranged in a same row.

Figure 18:
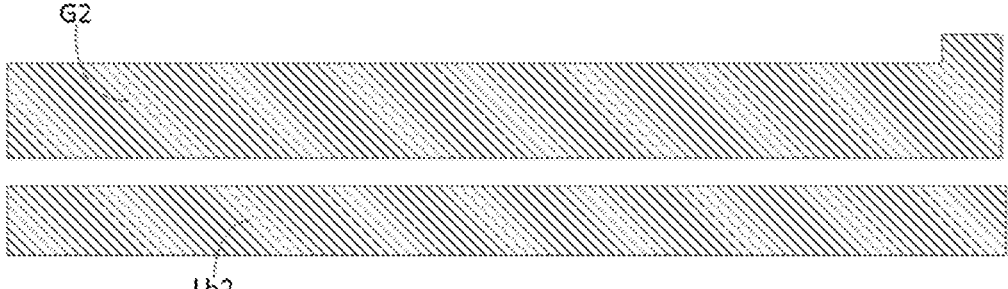
FIG. 18 is a schematic view showing the arrangement of the gate metal layer in FIG. 17.
Figure 19:
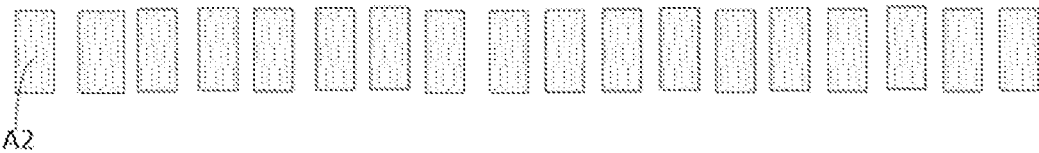
FIG. 19 is a schematic view showing the arrangement of the semiconductor layer in FIG. 17.
Figure 20:
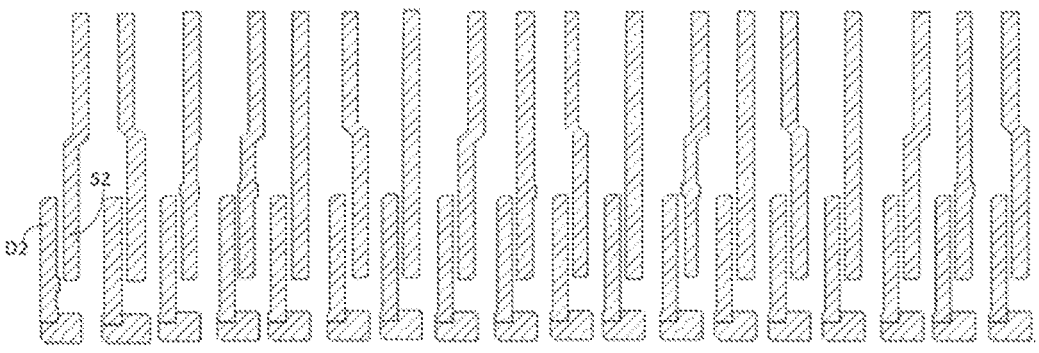
FIG. 20 is a schematic view showing the arrangement of the source/drain metal layer in FIG. 17.

FIG. 18 shows the arrangement of the gate metal layer in FIG. 17, FIG. 19 shows the arrangement of the semiconductor layer in FIG. 17, and FIG. 20 shows the arrangement of the source/drain metal layer in FIG. 17.

In a possible embodiment of the present disclosure, the first electrode S2 of the second switching transistor MZ2 is electrically coupled to the second touch electrode, and the second electrode D2 of the second switching transistor MZ2 is electrically coupled to a second voltage line portion Lb2, and the second voltage line portion Lb2 is included in the first voltage line and used to provide the common electrode voltage.

As shown in FIG. 18, G2 represents a second gate metal layer pattern which serves as gate electrodes of all the second switching transistors MZ2 in the second transistor arrangement region W2.

In FIG. 20, S2 represents the first electrode of the second switching transistor MZ2, and D2 represents the second electrode of the second switching transistor MZ2.

In FIG. 19, A2 represents an active layer pattern of MZ2.

Figure 21:
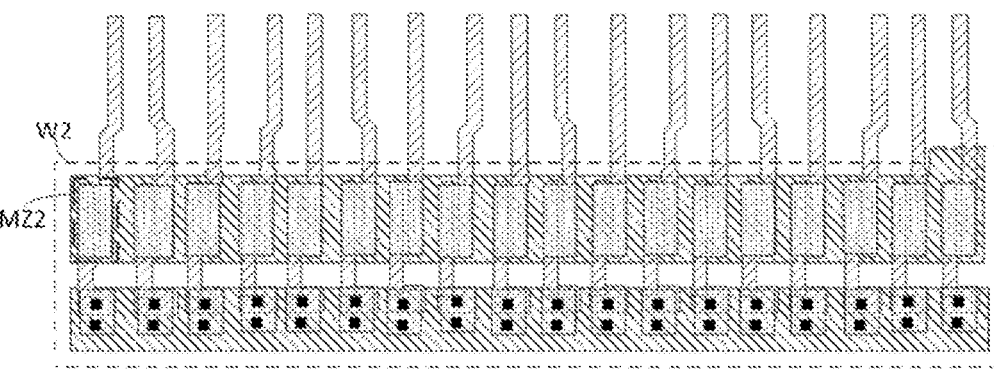
FIG. 21 is a schematic view showing a situation where the conductive layer and the via holes are added on the basis of FIG. 17.

FIG. 21 shows a situation where the conductive layer is added on the basis of FIG. 17. The conductive layer is arranged at a side of the source/drain metal layer away from the base substrate.

Figure 22:
FIG. 22 is a schematic view showing the arrangement of the conductive layer in FIG. 21.

FIG. 22 shows the arrangement of the conductive layer in FIG. 21. In FIG. 22, Z5 represents the fifth adapter member, and the second electrode D2 of the second switching transistor MZ2 is electrically coupled to the second voltage line portion Lb2 for providing the common electrode voltage through the fifth adapter member Z5 formed in the conductive layer, so as to receive the common electrode voltage.

Figure 23:
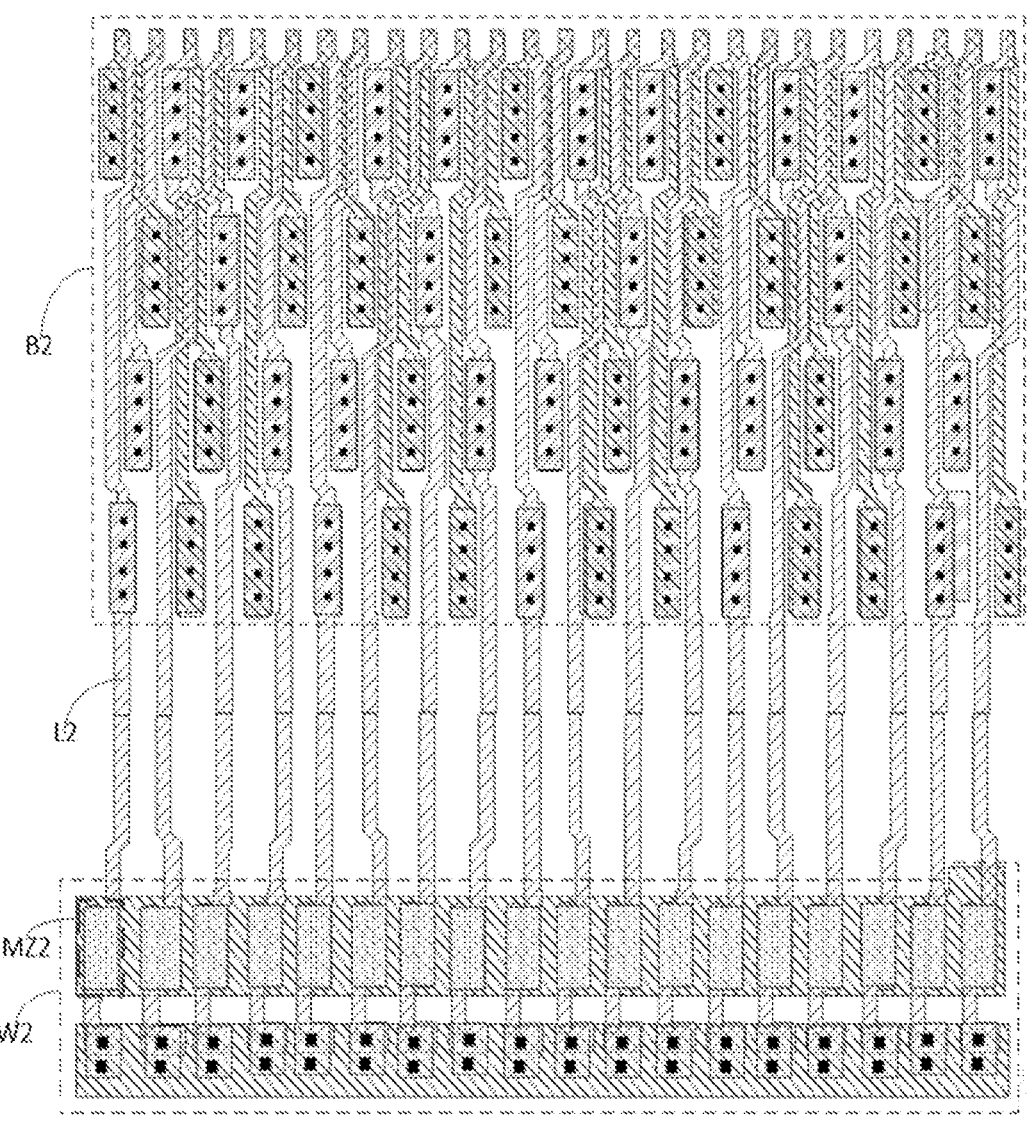
FIG. 23 is a schematic view showing a connection relationship between the second touch electrode in the second electrode arrangement region B2 and a corresponding second switching transistor in the second transistor arrangement region W2 according to one embodiment of the present disclosure.

As shown in FIG. 23, B2 represents the second electrode arrangement region, W2 represents the second transistor arrangement region, and the second touch electrode arranged in the second electrode arrangement region B2 is electrically coupled to the second switching transistor MZ2 arranged in the second transistor arrangement region W2.

In FIG. 23, in the second transistor arrangement region W2, a pitch between adjacent second switching units is, but not limited to, 25.5 μm, and a width of a single second switching unit is, but not limited to, 16 μm. Hence, in the second transistor arrangement region W2, the second switching units arranged in one row. The second switching unit includes the second switching transistors.

Figure 24:
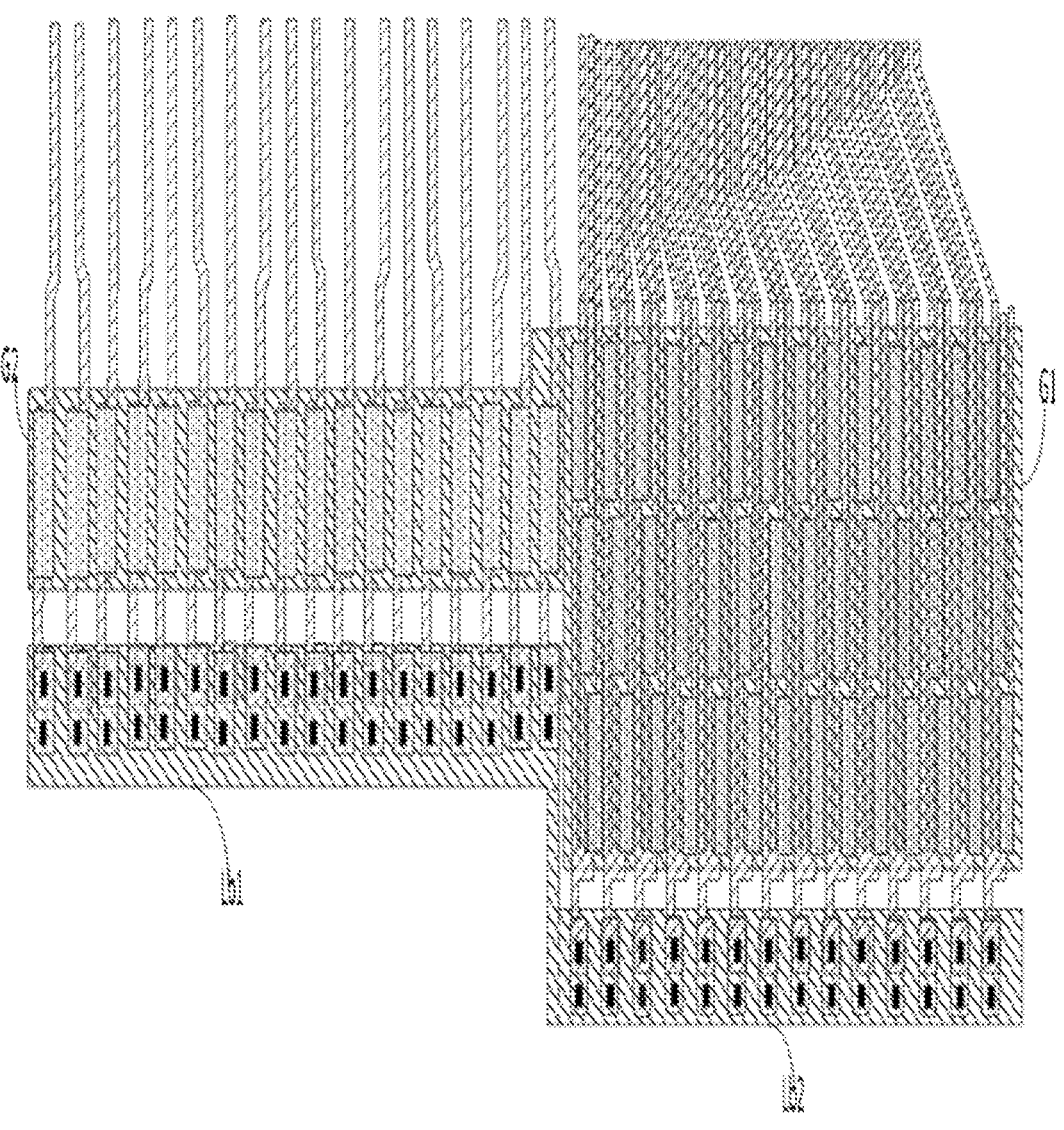
FIG. 24 is a schematic view showing a position relationship between the first transistor arrangement region and the second transistor arrangement region according to one embodiment of the present disclosure.

As shown in FIG. 24, the first gate metal layer pattern G1 and the second gate metal layer pattern G2 are formed integrally, Lb1 and Lb2 are formed integrally, and both Lb1 and Lb2 are included in the first voltage line.

Figure 25:
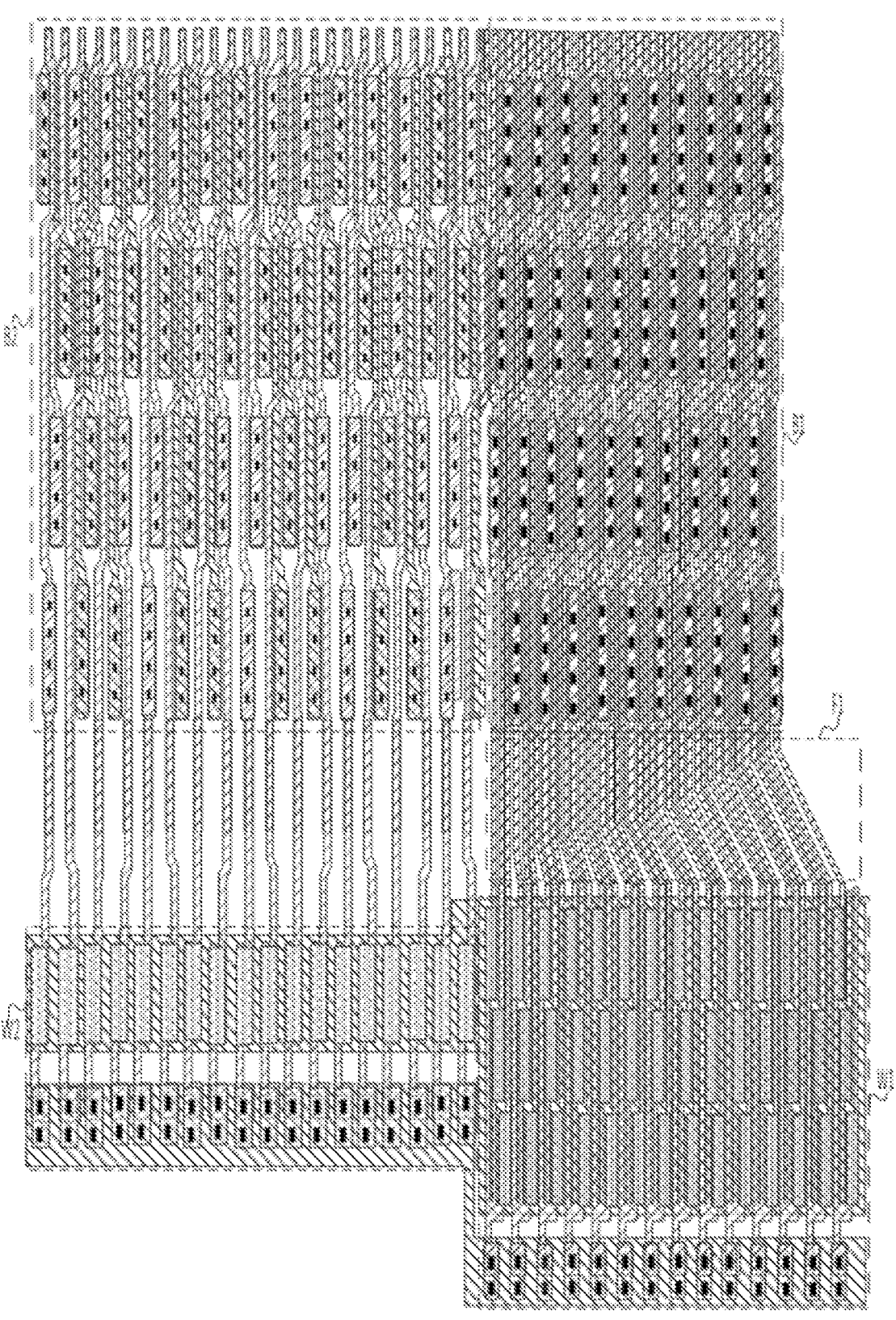
FIG. 25 is a schematic view showing a position relationship among the first electrode arrangement region B1, the second transistor arrangement region B2, a fan-out region F1, the first transistor arrangement region W1 and the second transistor arrangement region W2 according to one embodiment of the present disclosure.

In FIG. 25, B1 represents the first electrode arrangement region, B2 represents the second electrode arrangement region, F1 represents the fan-out region, W1 represents the first transistor arrangement region, and W2 represents the second transistor arrangement region.

In a possible embodiment of the present disclosure, for a novel touch display driving circuitry with improved touch performance, the quantity of supported touch channels is, but not limited to, 1280, and the quantity of supported display data channels is, but not limited to, 2400.

In a possible embodiment of the present disclosure, the IC region further includes a dummy electrode arrangement region arranged at a side of the first electrode arrangement region away from the second electrode arrangement region, the display substrate further includes a plurality of dummy electrodes arranged in the dummy electrode arrangement region, and the dummy electrodes do not receive any signals.

During the implementation, the dummy electrode arrangement region is arranged at a side of the first electrode arrangement region away from the second electrode arrangement region, the plurality of dummy electrodes is arranged in the dummy electrode arrangement region so as to support the touch display IC and ensure a bonding effect of the touch display IC, and the dummy electrode does not receive any signal but merely functions as a support.

In a possible embodiment of the present disclosure, the display substrate includes the gate metal layer, the semiconductor layer, the source/drain metal layer and the conductive layer laminated one on another in a direction away from the base substrate. The dummy electrodes are formed in the source/drain metal layer or the gate metal layer, each dummy electrode is electrically coupled to a sixth adapter member formed in the conductive layer, and the sixth adapter member does not receive any signal but also used to support the touch display IC.

Figure 26:
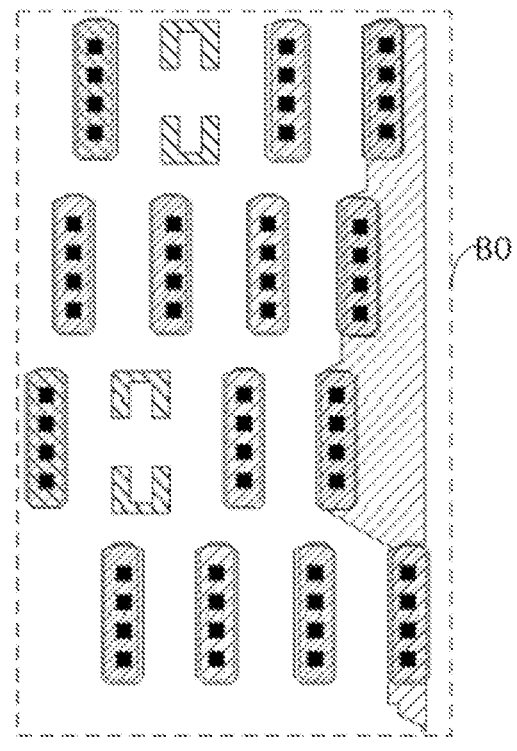
FIG. 26 is a schematic view showing an electrode arranged in a dummy electrode region B0 according to one embodiment of the present disclosure.

In FIG. 26, B0 represents the dummy electrode arrangement region.

Figure 27:
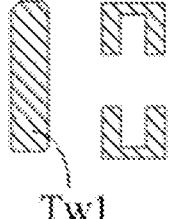
FIG. 27 is a schematic view showing the arrangement of the gate metal layer in FIG. 26.
Figure 27:
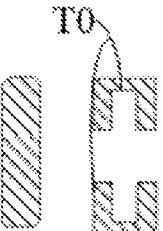
Figures 28, 29:
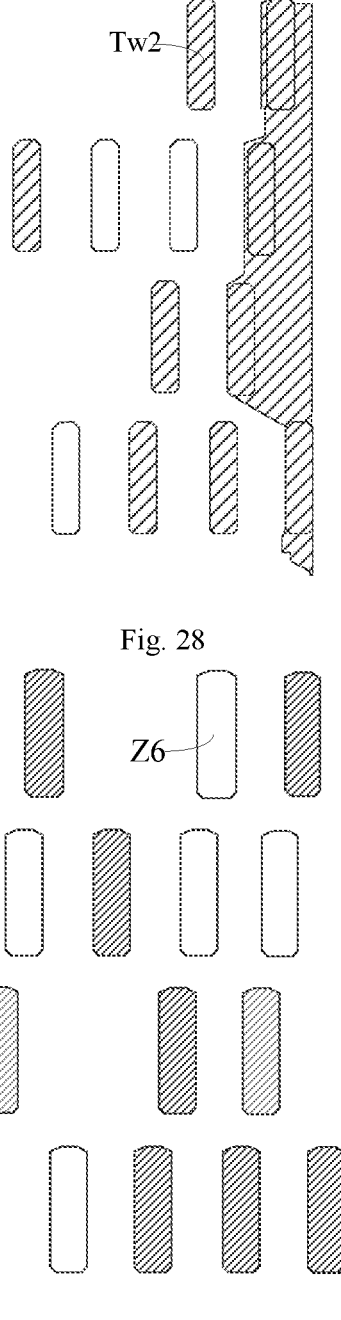
FIG. 28 is a schematic view showing the arrangement of the source/drain metal layer in FIG. 26.
FIG. 29 is a schematic view showing the arrangement of the conductive layer in FIG. 26.
Figure 30:
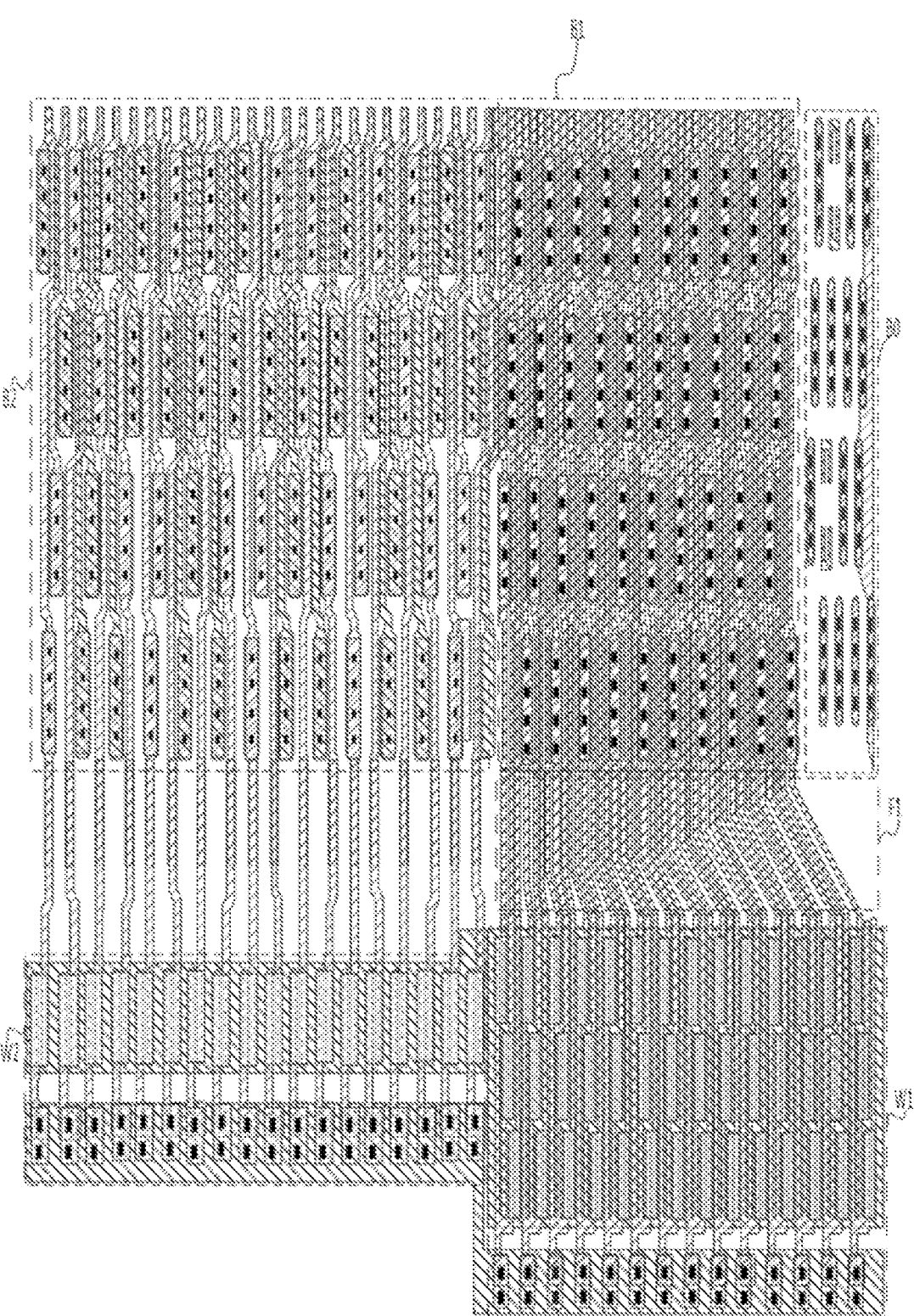
FIG. 30 is a schematic view showing a situation where the dummy electrode region B0 is added on the basis of FIG. 25.

FIG. 27 shows the arrangement of the gate metal layer in FIG. 26, FIG. 28 shows the arrangement of the source/drain metal layer in FIG. 26, and FIG. 29 shows the arrangement of the conductive layer in FIG. 26.

In FIG. 27, Tw1 represents a first dummy electrode. In FIG. 28, Tw2 represents a second dummy second. In FIG. 27, Z6 represents the sixth adapter member.

In FIG. 27, T0 represents an electrode for observing the quantity of bonded particles. Through the electrode T0, it is able to ensure the process stability during the production.

The present disclosure further provides in some embodiments a display device which includes the above-mentioned display substrate.

The display device may be any product or member having a display function, such as a mobile phone, a tablet computer, a television, a monitor, a laptop computer, a digital photo frame, or a navigator.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A display substrate, comprising a base substrate, wherein the base substrate comprises an integrated circuit (IC) region, and the IC region comprises a first electrode arrangement region and a first transistor arrangement region, wherein the display substrate comprises a plurality of first touch electrodes arranged in rows and columns in the first electrode arrangement region and a plurality of first switching transistors arranged in the first transistor arrangement region, the first touch electrode is electrically coupled to a corresponding first switching transistor, and an orthogonal projection of a display data receiving electrode onto the base substrate does not overlap with an orthogonal projection of the first touch electrode onto the base substrate;

wherein the IC region further comprises a fan-out region, the first touch electrode is electrically coupled to a first electrode of the first switching transistor through a connection line arranged in the fan-out region, and a second electrode of the first switching transistor is electrically coupled to a first voltage line for providing a common electrode voltage.

2. The display substrate according to claim 1, wherein the plurality of first switching transistors is arranged in the first transistor arrangement region in an array form.

3. The display substrate according to claim 1, wherein the display substrate comprises a gate metal layer, a semiconductor layer and a source/drain metal layer laminated one on another in a direction away from the base substrate, the first touch electrode is formed in the source/drain metal layer, a gate electrode of the first switching transistor is formed in the gate metal layer, the first electrode of the first switching transistor and the second electrode of the first switching transistor are formed in the source/drain metal layer, and an active layer pattern of the first switching transistor is formed in the semiconductor layer.

4. The display substrate according to claim 3, further comprising a conductive layer arranged at a side of the source/drain metal layer away from the base substrate, and a touch display IC arranged at a side of the conductive layer away from the base substrate, wherein the first touch electrode is electrically coupled to a first electrode pin of the touch display IC through a first adapter member formed in the conductive layer, and the touch display IC is configured to provide a touch signal through the first electrode pin.

5. The display substrate according to claim 4, wherein the first voltage line is formed in the gate metal layer, and the second electrode of the first switching transistor is electrically coupled to the first voltage line through a second adapter member formed in the conductive layer.

6. The display substrate according to claim 1, wherein the IC region further comprises a second electrode arrangement region, the display substrate further comprises a plurality of electrode groups arranged in rows in the second electrode arrangement region, the electrode group in each row comprises a plurality of second touch electrodes and a plurality of display data receiving electrodes, and the second touch electrodes and the display data receiving electrodes are arranged alternately in the electrode group in each row.

7. The display substrate according to claim 6, wherein in the electrode group in each row, one second touch electrode and at least two display data receiving electrodes are arranged alternately.

8. The display substrate according to claim 6, wherein in the electrode groups in adjacent rows, the second touch electrodes are located in different columns.

9. The display substrate according to claim 6, wherein the IC region further comprises a second transistor arrangement region, the display substrate comprises a plurality of second switching transistors arranged in the second transistor arrangement region, the second touch electrode is electrically coupled to a first electrode of a corresponding second switching transistor, and a second electrode of the second switching transistor is electrically coupled to the first voltage line for providing the common electrode voltage.

10. The display substrate according to claim 9, wherein the plurality of second switching transistors is arranged in a same row.

11. The display substrate according to claim 9, wherein the display substrate comprises a gate metal layer, a semiconductor layer and a source/drain metal layer laminated one on another in a direction away from the base substrate, the second touch electrode is formed in the source/drain metal layer, a gate electrode of the second switching transistor is formed in the gate metal layer, the first electrode of the second switching transistor and the second electrode of the second switching transistor are formed in the source/drain metal layer, an active layer pattern of the second switching transistor is formed in the semiconductor layer, and the display data receiving electrodes are formed in the gate metal layer or the source/drain metal layer.

12. The display substrate according to claim 11, further comprising a conductive layer arranged at a side of the source/drain metal layer away from the base substrate, and a touch display IC arranged at a side of the conductive layer away from the base substrate, wherein the second touch electrode is electrically coupled to a first electrode pin of the touch display IC through a third adapter member formed in the conductive layer, and the touch display IC is configured to provide a touch signal through the first electrode pin.

13. The display substrate according to claim 12, wherein the display data receiving electrode is electrically coupled to a second electrode pin of the touch display IC through a fourth adapter member formed in the conductive layer, and the touch display IC is configured to provide a corresponding data voltage through the second electrode pin.

14. The display substrate according to claim 12, wherein the second electrode of the second switching transistor is electrically coupled to the first voltage line for providing the common electrode voltage through a fifth adapter member formed in the conductive layer.

15. The display substrate according to claim 9, wherein gate electrodes of the plurality of first switching transistors and gate electrodes of the plurality of second switching transistors are of a one-piece structure.

16. The display substrate according to claim 6, wherein the IC region further comprises a dummy electrode arrangement region arranged at a side of the first electrode arrangement region away from the second electrode arrangement region, the display substrate further comprises a plurality of dummy electrodes arranged in the dummy electrode arrangement region, and the dummy electrodes do not receive signals.

17. The display substrate according to claim 16, wherein the display substrate comprises a gate metal layer, a semiconductor layer, a source/drain metal layer and a conductive layer laminated one on another in a direction away from the base substrate, the dummy electrodes are formed in the source/drain metal layer or the gate metal layer, the dummy electrode is electrically coupled to a sixth adapter member formed in the conductive layer, and the sixth adapter member does not receive any signal.

18. A display device, comprising the display substrate according to claim 1.

19. A display substrate, comprising a base substrate, wherein the base substrate comprises an integrated circuit (IC) region, and the IC region comprises a first electrode arrangement region and a first transistor arrangement region, wherein the display substrate comprises a plurality of first touch electrodes arranged in rows and columns in the first electrode arrangement region and a plurality of first switching transistors arranged in the first transistor arrangement region, the first touch electrode is electrically coupled to a corresponding first switching transistor, and an orthogonal projection of a display data receiving electrode onto the base substrate does not overlap with an orthogonal projection of the first touch electrode onto the base substrate;

wherein the IC region further comprises a second electrode arrangement region, the display substrate further comprises a plurality of electrode groups arranged in rows in the second electrode arrangement region, the electrode group in each row comprises a plurality of second touch electrodes and a plurality of display data receiving electrodes, and the second touch electrodes and the display data receiving electrodes are arranged alternately in the electrode group in each row;

wherein the IC region further comprises a second transistor arrangement region, the display substrate comprises a plurality of second switching transistors arranged in the second transistor arrangement region, the second touch electrode is electrically coupled to a first electrode of a corresponding second switching transistor, and a second electrode of the second switching transistor is electrically coupled to the first voltage line for providing the common electrode voltage.

* * * * *